United States Patent [19]

Miyamoto

[11] 3,947,710

[45] Mar. 30, 1976

[54] FLYWHEEL TYPE MAGNETO GENERATOR FOR A ROTARY ENGINE

[75] Inventor: Mitsunori Miyamoto, Numazu, Japan

[73] Assignee: Kokusan Denki Co., Ltd., Numazu, Japan

[22] Filed: July 25, 1974

[21] Appl. No.: 491,813

[30] Foreign Application Priority Data

| July 27, 1973 | Japan | 48-88296[U] |
| Oct. 1, 1973 | Japan | 48-114532[U] |
| Oct. 1, 1973 | Japan | 48-114533[U] |
| Oct. 1, 1973 | Japan | 48-114534[U] |

[52] U.S. Cl. ............... 310/153; 310/74; 123/149 D
[51] Int. Cl.² ........................................... H02K 21/22
[58] Field of Search ........... 310/174, 153, 70, 70 A, 310/74; 322/4, 91; 315/209, 218; 123/149, 149 A, 149 B, 149 C, 149 D; 74/572, 573

[56] References Cited
UNITED STATES PATENTS

| 2,101,392 | 12/1937 | Harmon | 310/153 |
| 2,447,727 | 8/1948 | Alstrom | 310/153 |
| 2,472,313 | 6/1949 | Phelon | 310/153 |
| 2,627,041 | 1/1953 | Phelon | 310/153 |
| 2,786,154 | 3/1957 | Phelon | 310/153 |
| 2,806,156 | 9/1957 | Phelon | 310/153 |
| 3,732,483 | 5/1973 | Katsumata | 123/149 |
| 3,746,901 | 7/1917 | Berg | 310/153 |
| 3,821,570 | 6/1974 | Burson | 310/153 |

*Primary Examiner*—R. Skudy
*Attorney, Agent, or Firm*—Woodling, Krost, Granger & Rust

[57] ABSTRACT

A flywheel type magneto generator for a rotary engine comprising a stator including generating coil and a rotor including a flywheel connected to the output shaft of the rotary engine and magnet field mounted on the flywheel, characterized by said flywheel of said rotor having balance weight mounted thereon whereby the output shaft of the rotary engine is balanced in weight.

7 Claims, 12 Drawing Figures

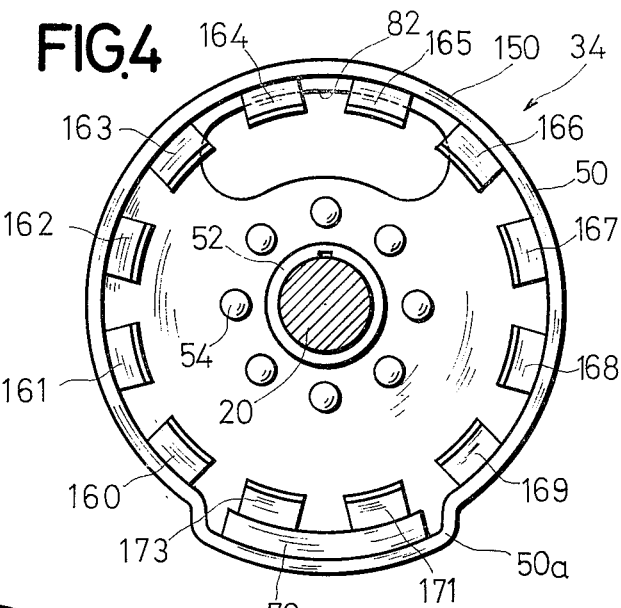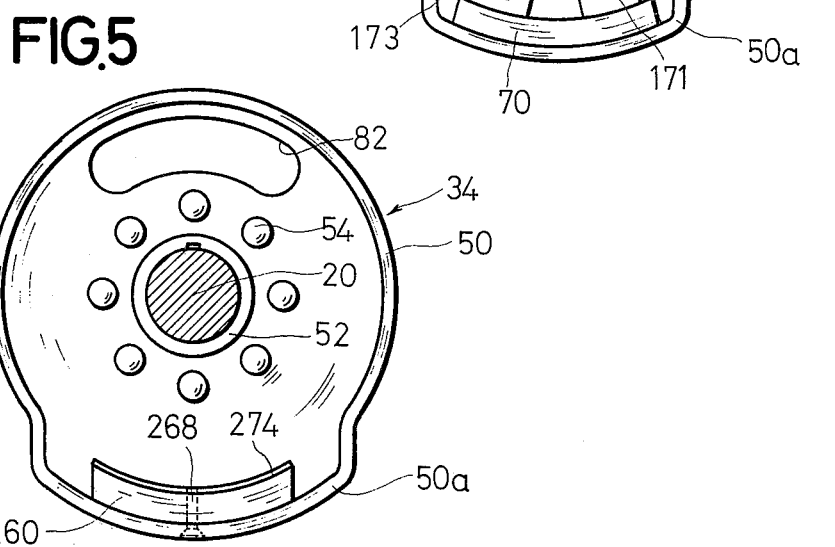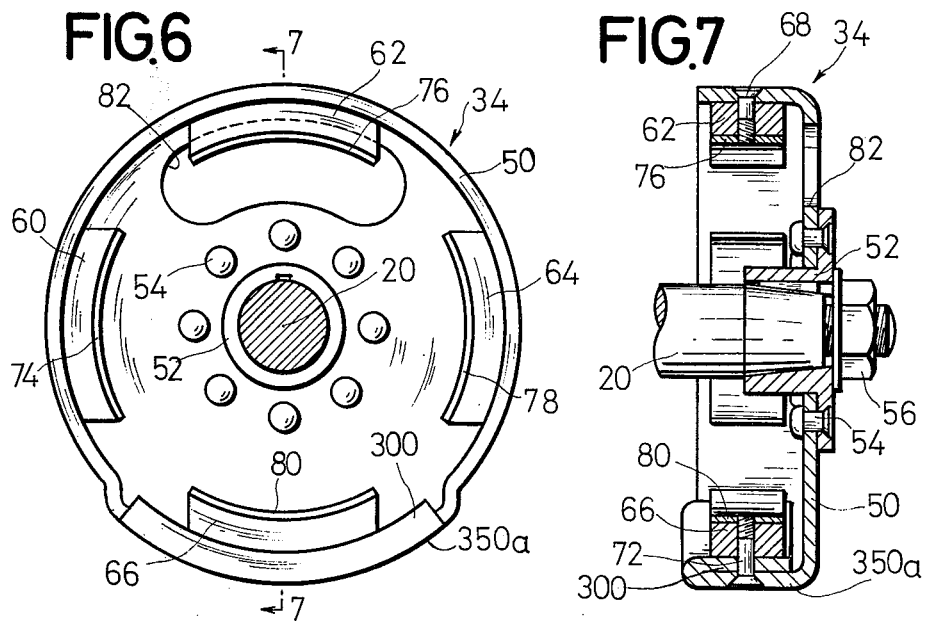

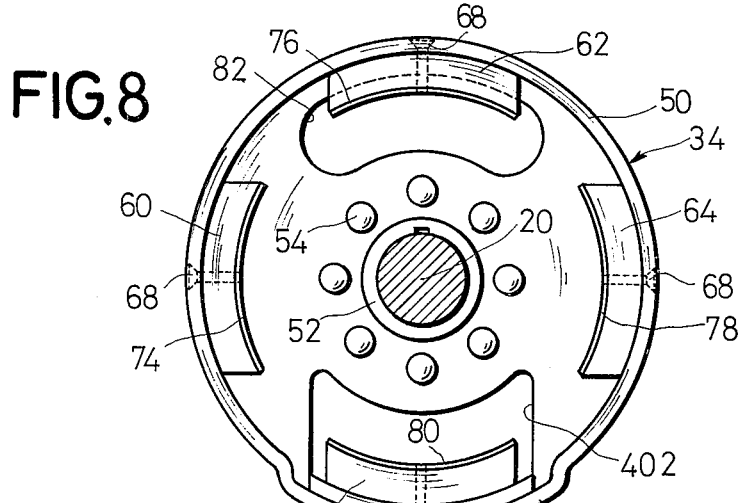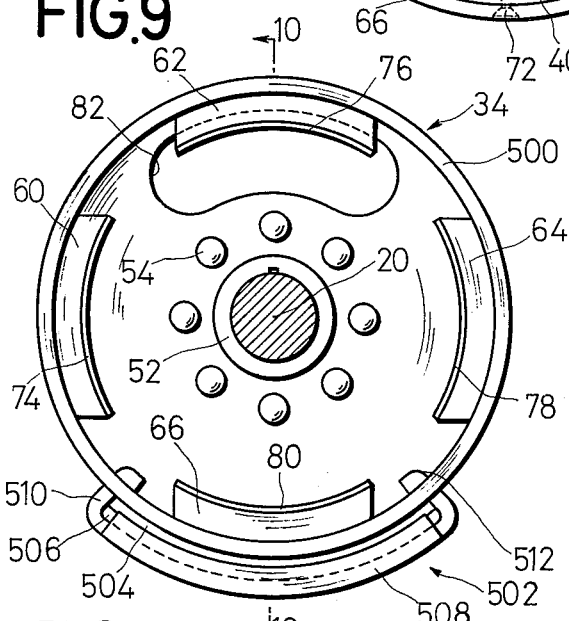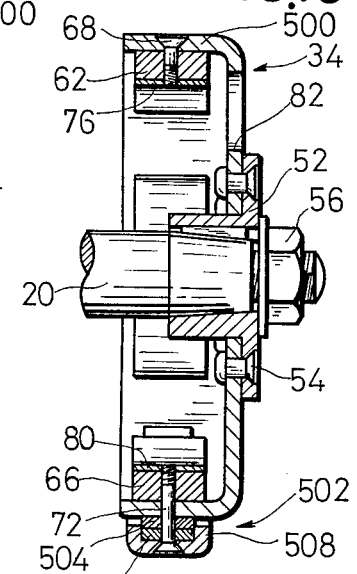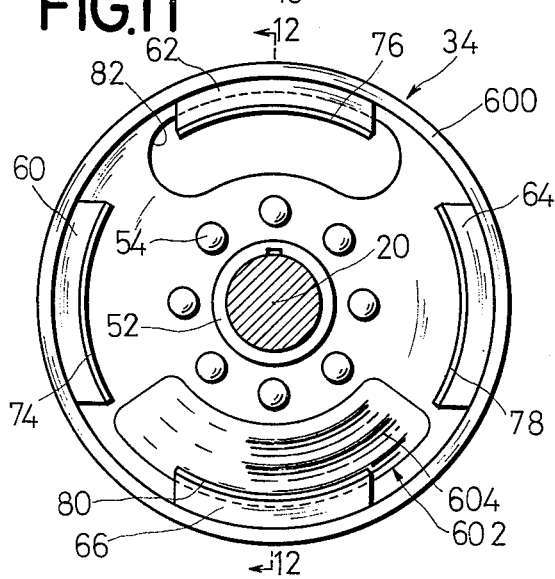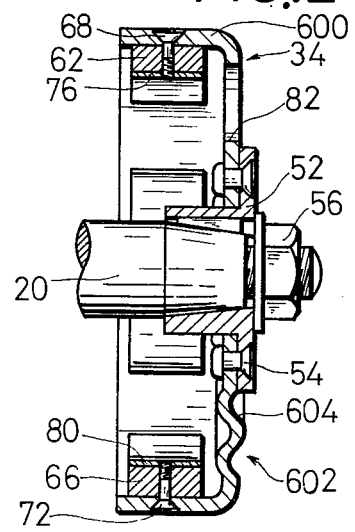

3,947,710

FLYWHEEL TYPE MAGNETO GENERATOR FOR A ROTARY ENGINE

FIELD OF THE INVENTION

This invention generally relates to a flywheel type magneto generator for a rotary engine and more particularly to a magnet rotar connected to an output shaft of a rotary engine wherein a balance weight is provided for compensate mechanical unbalance of the rotary portion of the rotary engine.

BACKGROUND OF THE INVENTION

In general, a suitable balance weight is provided which is mounted for compensation for mechanical unbalance of a rotary engine in consideration of its mechanism. The rotary engine practically used at present comprises a rotary journal portion or portions provided eccentrically of the output shaft of the engine relative to the axis thereof, on which a rotor is held. Therefore, the rotary engine cannot avoid the mechanical unabalance of the rotatably moving portion. The extent of such mechanical unabalance of the rotary engine is usually several kg/cm which can be compensated by mounting a balance weight or weights on the output shaft of the rotary engine. The balance weights are commonly provided on both sides of the rotary journal portion or portions opposite thereto that is at the angle of 180° relative to the rotor journal portion or portions in a conventional rotary engine. More particularly, in a rotary engine of dual rotor type, one of the rotors has a balance weight mounted on the output shaft of the engine opposite to one of the rotor journal portions that is at the angle of 180° relative thereto, on which one of the rotors is journaled and the other rotor has a balance weight mounted on the output shaft of the engine opposite to the other rotor journal portion that is at the angle of 180° relative thereto. In addition thereto, a flywheel is conventionally mounted on the output shaft of the engine for balancing the variation in rotating power applied to the shaft. It has been proposed that one of the balance weights is mounted on the flywheel for compensation for the unbalance of the rotatably moving parts.

Of late, it has been tried to use a rotary engine of various features as an engine for a bicycle. In the rotary engine for a bicycle, it is necessary that a magneto generator is connected to the output shaft of the engine so that it is driven thereby to provide the power necessary to ignite the engine or to energize lamp load. Conventionally, such magneto generator comprises a stator including igniting coil means to supply igniting power to the engine and lighting or battery charging coil means, and a bowl-like flywheel type magnet rotar rotatably disposed outside of the stator and connected to and driven by the output shaft of the engine. Thus, due to the balance weight or weights mounted on and the flywheel type magneto generator connected to the output shaft of the engine, there has been an increase in the length of the output shaft resulting in large size of the engine. Such increased length of the output shaft is unpreferable in consideration of requirement of lightweight and compactness of the engine for a bicycle.

OBJECT OF THE INVENTION

Accordingly, it is a principal object of the present invention to provide a flywheel type magneto generator for a rotary engine wherein balance weight means is provided on a magnet rotor of flywheel connected directly to the rotary engine for compensating for the unbalance of the rotary engine.

SUMMARY OF THE INVENTION

In accordance with the present invention, there is provided a flywheel type magneto generator for a rotary engine comprising a stator including generating coil means and a rotor including a flywheel connected to the output shaft of the rotary engine and magnet field means mounted on the flywheel, characterized by said flywheel of said rotor having balance weight means mounted thereon whereby the output shaft of the rotary engine is balanced in weight.

BRIEF DESCRIPTION OF THE DRAWINGS

The above and other objects and features of the present invention will be apparent from the teaching of the following description of preferred embodiments of the present invention, taken with reference to the accompanying drawings in which;

FIG. 4 is similar to FIG. 3, but shows a 12 pole flywheel type rotor;

FIG. 5 is similar to FIGS. 3 and 4, but shows a 3 pole flywheel type rotor;

FIG. 6 is similar to FIG. 3, but shows a modification of a flywheel type rotor of a magneto generator for a rotary engine;

FIG. 7 is a cross sectional view of the rotor taken along the line 7—7 of FIG. 6;

FIG. 8 is similar to FIG. 6, but shows further modification of the rotor of FIG. 6;

FIG. 9 shows in elevational view a further modification of the flywheel type rotor of FIG. 3;

FIG. 10 is a cross sectional view of the rotor taken along the line 10—10;

FIG. 11 shows in elevational view a still modification of the rotor of FIG. 3; and FIG. 12 is a cross sectional view of the rotor taken along the line 12—12 of FIG. 11.

DETAILED DESCRIPTION OF PREFERRED EMBODIMENTS OF THE PRESENT INVENTION

Figure 1:
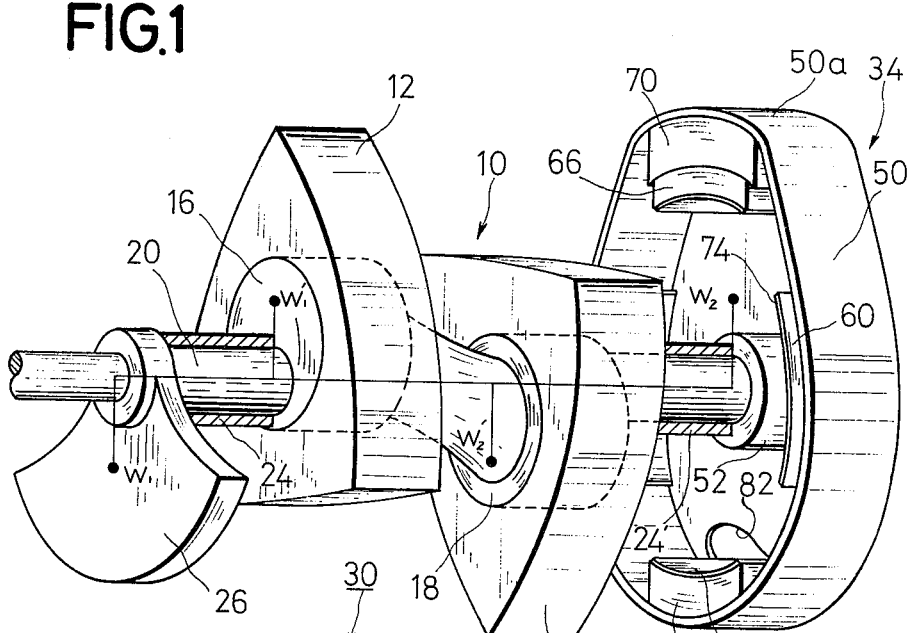
FIG. 1 is a perspective view of an assembly of two rotors of a rotary engine and a flywheel type rotor of a magneto generator connected to the engine.

Referring now to FIG. 1, there is illustrated a dual rotor assembly 10 for a rotary engine including two rotors 12 and 14 securedly mounted on respective journal portions 16 and 18 which are in turn secured to an output shaft 20 of the engine in an eccentric relation thereto. The dual rotor assembly 10 is enclosed in an engine housing 22 (see FIG. 2) so that it rotates in a gas tight relationship to the walls of the housing. The output shaft 20 may be journaled adjacent to both ends on bearings 24 and 24' which are in turn mounted on the engine housing 22. A sectoral balance weight 26 is provided which is secured to the output shaft 20 for compensation for the unbalance $W_1{}'$ by the engine rotor 12, as indicated at an arrow $W_1$ of FIG. 1. It will be seen from FIG. 1 that the balance weight 26 is at the angle of 180° relative to the rotor journal portion 16.

The unbalance by the engine rotor 14 is compensated by a magneto generator 30 in accordance with the present invention as described hereinafter.

Figure 2:
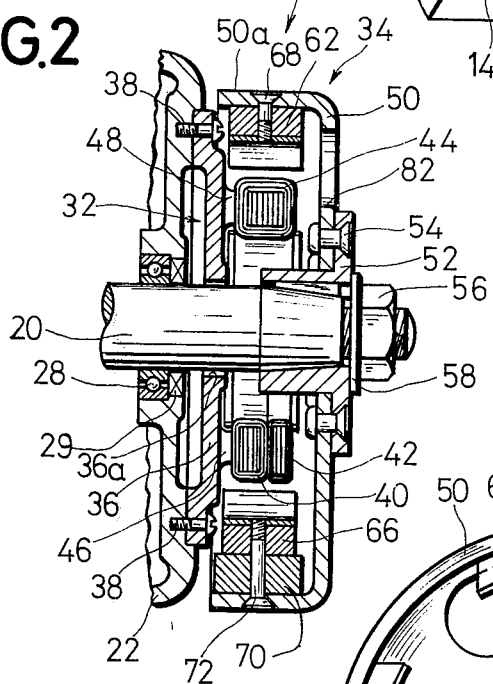
FIG. 2 is a vertically sectional view of a magneto generator in accordance with one embodiment of the present invention.

The magneto generator 30 of the present invention, as shown in FIG. 2, comprises a stator 32 mounted on the engine housing 22 and a flywheel type magnet rotor 34 connected to the output shaft 20 at the extended end from the engine housing. The stator 32 comprises a base plate 36 secured to the end wall of the engine housing 22 by a plurality of screws 38 threadedly extending through the base plate 36 at the edge and the end wall of the engine housing 22. Only one screw 38 is shown in FIG. 2. The base plate 36 is provided with a center opening 36a through which the end of the output shaft extends. it is shown in FIG. 2 that a ball bearing 28 is mounted to rotatably bear the output shaft 20 and that an oil seal 29 is provided in the opening of the end wall of the engine housing to seal the engine housing at the opening. The stator 32 includes an igniting power coil 40 and a signaling coil 42 which are associated with a breakerless ignition circuit (not shown) to ignite the rotary engine, and a lighting or battery charging coil 44. The coils 40 and 42 are mounted on a support 46 extending from the base plate 36 by any suitable means and the coil 44 is mounted on a support 48 also extending from the base plate 36 in a similar manner.

The flywheel type magnet rotor 34 of the magneto generator 30 comprises a bowl-like flywheel 50 of magnetic material such as iron which is provided with a hub 52 flanged to the flywheel 50 by flush bolts 54 and fitted onto the tapered end of the output shaft 20 of the engine with a nut 56 threadedly engaging the threaded portion of the output shaft 20 to secure the flywheel 50 thereto so as to rotate the rotor 34 together with the output shaft 20. A washer 58 may be interposed between the hub 52 and the nut 56. FIG. 1 shows the flywheel type rotor 34 of the magneto generator 30 connected to the output shaft 20 in the above-mentioned manner.

Figure 3:
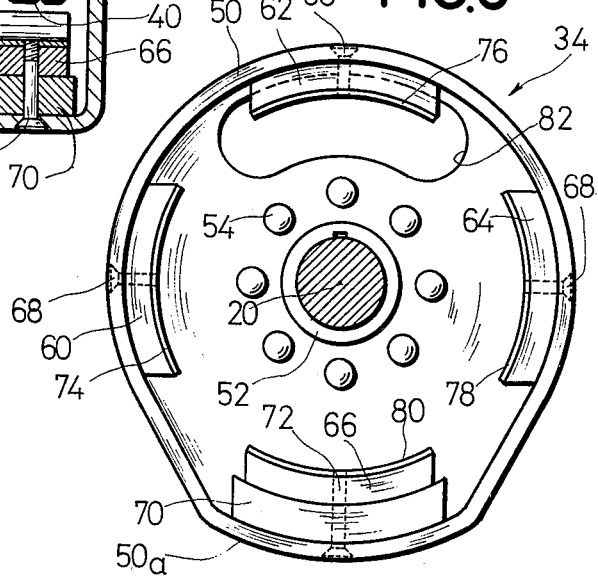
FIG. 3 is an elevational view of the flywheel type rotor of the generator of FIG. 2.

As seen from FIGS. 1 and 3, the flywheel 50 at the cylindrical wall has a bulge 50a extending radially and outwardly therefrom so that it is in the form of a partially bellied bowl. In the illustrated embodiment of FIGS. 1 to 3, the rotor 34 is of four pole type and includes four segmental magnets 60 to 66 magnetized across the thickness. The magnets 60 to 66 are spaced to each other in an equally angular manner relative to the axis of the flywheel 50. The magnets 60 to 64 are fixed directly to the equally radial inner surface of the cylindrical wall of the flywheel 50 by respective flush bolts 68 threadely extending through both flywheel and the magnets, but the remaining magnet 66 is fixed to the inner surface of the bulged portion 50a of the flywheel 50 with a spacer 70 of magnetic material interposed between the bulged portion 50a of the flywheel 50 and the magnet 66, by a flush bolt 72 threadely extending through all of the flywheel 50, the spacer 70 and the magnet 66. It will be understood that respective pole pieces 74 to 80 may be provided on the inner surface of the magnets 60 to 66 and secured thereto by the flush bolts 68 and 72 threadedly also extending therethrough. The magnets, the associated pole pieces and the spacer may be secured to each other additionally by adhesive. It should be noted that the thickness of the spacer is determined so that the pole piece 80 is positioned at the same radius as those at which the remaining pole pieces 74 to 78 are positioned relative to the axis of the flywheel 50. It should be also noted that the bulged portion 50a of the flywheel 50 and the spacer 70 are disposed at the angle of 180° relative to the rotor journal portion 18 eccentric to the output shaft 20.

With the arrangement of FIGS. 1 to 3, the mass of the bulged portion 5a of the flywheel 50 and the spacer 70 provides the balance weight $W_2$ to the output shaft 20 so as to compensate for the unbalance $W_2'$ by the engine rotor 14. In this arrangement, it will be noted that the magnet 66 provides no balance weight to the output shaft 20 of the engine. Accordingly, it is of no significance that the magnet 66 is disposed on the bulged portion 50a of the flywheel 50 and therefore, may be displaced out of the bulged portion 50a of the flywheel.

In the illustrated embodiment, a balancing opening 82 may be provided in the bottom wall of the bowl-like flywheel 50 opposite to the bulged portion 50a to compensate for the unbalance by the engine rotor 14 together with the bulged portion 50a of the flywheel 50 and the spacer or weight element 70. If the bulged portion 50a with the weight element 70 is sufficient to compensate for the unbalance of the output shaft 20 by the engine rotor 14, then the opening 82 may be eliminated. Also, if only the bulged portion 50a is sufficient, then the weight element 72 may be eliminated where the magnet 66 is displaced out of the bulged portion of the flywheel 50. The extent of the balance weight depends upon the thickness and the radius of the bulged portion 50a and therefore, can be sufficient to compensate for the unbalance of the output shaft 20 by properly determining the thickness and radius of the bulged portion 50a.

The magnet rotor 34 of FIG. 4 is substantially identical to that of FIG. 3, but has 12 rather than 4 poles. Ten magnets 160 to 169 are mounted on the bowl-like flywheel 50 in the same manner as that in which the magnets 60 to 64 of FIG. 3 are mounted while two magnets 171 and 173 are mounted on the bulged portion 50a of the flywheel 50 with the common spacer (weight element) 70 interposed between the magnets 171 and 173 and the bulged portion 50a of the flywheel 50. The same components are designated by the same numerals.

The magnet rotor 34 of FIG. 5 is also substantially identical, but has a single magnet 260 fixed directly to the inner surface of the bulged portion 50a of the flywheel 50 by a flush bolt 268 threadedly extending through the bulged portion 50a and the magnet 260. A pole piece 274 is also mounted on the inner surface of the magnet 260 in the same manner as that in which the pole pieces 74 to 78 of FIG. 3 are mounted. It should be noted that the pole piece 274 on the inner surface is at the same radius of the flywheel 50 as that at which the cylindrical wall of the flywheel on the inner surface is positioned. Thus, the cylindrical wall of the flywheel 50 constitutes the other pole piece of the magnet rotor 34. Thus, the magnet rotor 34 of FIG. 5 is of two pole type. With this magnet rotor 34, the magnet 260 together with the bulged portion 50a of the flywheel 50 serves to balance the output shaft 20 of the rotary engine in connection with the engine rotor 14 of FIG. 1. Also, the same components are designated by the same numerals.

The magnet rotor 34 of FIGS. 6 and 7 is substantially identical to that of FIGS. 1 to 3, but has the bulged portion 350a of the flywheel 50 thickened so as to eliminate the spacer 70 as shown in FIGS. 1 to 4. In the embodiment of FIGS. 6 and 7, the thickened bulged portion 350a may be provided with an extension 300 extending from and integral with the edge of the cylindrical wall of the flywheel 50 and turned inwardly of and engaging against the bulged portion 350a as shown in FIG. 7. It will be noted that the turned extension 300 serves the same function as that of the spacer 70 of FIGS. 1 to 3.

The magnet rotor 34 of FIG. 8 is substantially identical to that of FIGS. 6 and 7, but the thickened bulged portion 50a is provided with a piece 400 blanked or punched from the bottom wall of the flywheel 50 so as to be integral with the flywheel and turned inwardly of and engaging against the bulged portion 50a. Numeral 402 shows an oepning formed by blanking the piece 400 from the bottom wall of the flywheel. It will be also noted that the turned piece 400 serves the same function as that of the spacer 70 in FIGS. 1 to 3. In FIGS. 6 to 8 the same components are also designated by the same numerals.

The magnet rotor 34 of FIGS. 9 and 10 comprises a bowl-like flywheel 500 having a fully cylindrical wall. The flywheel 500 is provided with a balance weight 502 comprising a plurality of metal plates 504, 506 and 508 laminated to each other and disposed around a portion of the outer periphery of the flywheel 500. The outermost plate 508 has the opposite edges turned inwardly so as to hold the plates 504 and 506 therein and has the opposite ends turned to form hooked portions 510 and 512. As seen from FIG. 9, the hooked portions extend through the cylindrical wall of the flywheel 500 and are turned in an opposite direction to one another to latch or attach the balance weight 502 to the flywheel 500. Of course, the balance weight 502 should be oriented so that it balances the output shaft 20 of the rotary engine in connection with the engine rotor 14 as shown in FIG. 1. It will be understood that the outermost plate may be welded at the opposite ends to the outer periphery of said flywheel.

The magnet rotor 34 of FIGS. 11 and 12 also comprises a bowl-like flywheel 600 similar to that of FIGS. 9 and 10, but a balance weight 602 comprises a corrugated portion 604 formed in the bottom wall of the flywheel 600. Since the corrugated portion 604 has more mass than the other portion of the flywheel 600, it serves to balance the output shaft 20 of the rotary engine in connection with the engine rotor 14 as shown in FIG. 1. In FIGS. 9 to 12, the same components are designated by the same numerals.

While some preferred embodiments of the present invention have been illustrated and described with reference to the accompanying drawings, it will be apparent to those skilled in the art that various modifications and changes in construction and arrangement might be made within the spirit and scope of the invention, which is intended to be defined only to the appended claims.

What is claimed is:

1. A flywheel type magneto generator for a rotary engine comprising a stator including generating coil means and a rotor including a flywheel connected to the output shaft of the rotary engine and magnet field means mounted on said flywheel, said flywheel of said rotor having balance weight means comprising a bulged portion radially and outwardly bellied from the cylindrical wall of said flywheel and further comprising a weight element mounted on the inner surface of said bulged portion.

2. A flywheel type magneto generator as set forth in claim 1, further comprising an opening provided in said flywheel in an opposite side of said flywheel to said balance weight means.

3. A flywheel type magneto generator as set forth in claim 1 wherein two of said magnet field means are disposed adjacent to said bulged portion, said weight element being interposed between said bulged portion and both of said two magnet field means and serving as a spacer therebetween.

4. A flywheel type magneto generator as set forth in calim 1, wherein said balance weight means comprises a plurality of plates laminated to one another and secured to the outer periphery of said flywheel.

5. A flywheel type magneto generator as set forth in claim 4, the outermost one of said plates having the opposite outer edges turned inwardly so as to hold the other plates therein.

6. A flywheel type magneto generator as set forth in claim 4, the outermost one of said plates having the opposite ends hooked with said hooked ends latched to said flywheel.

7. A flywheel type magneto generator as set forth in claim 1, wherein said balance weight comprises a corrugated portion formed in the bottom wall of said flywheel.

* * * * *